Dec. 7, 1965  R. A. LENFANT  3,222,581
CAPACITIVE PICKUP DEVICES
Filed June 29, 1961  3 Sheets-Sheet 1
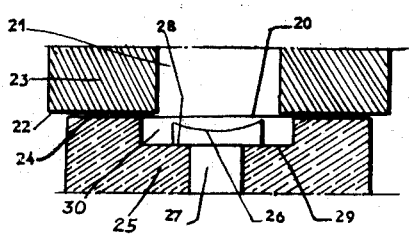
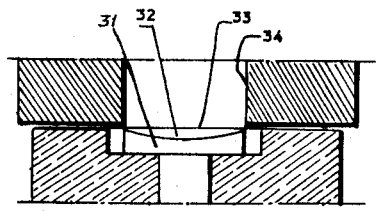
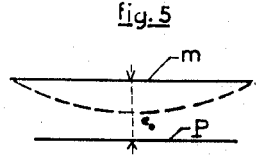
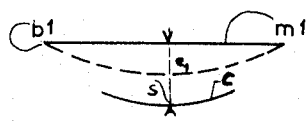
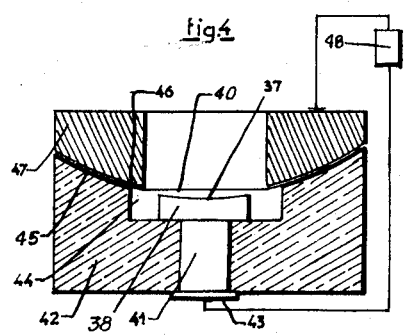
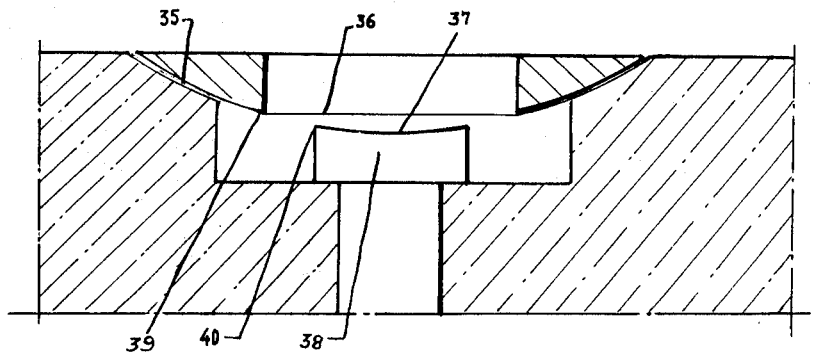
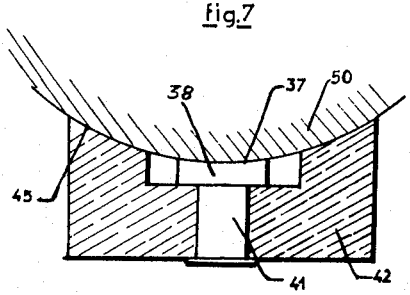
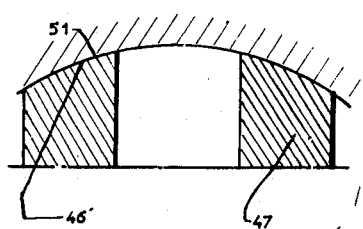
INVENTOR
RENÉ ANDRÉ LENFANT
BY
ATTORNEY Dec. 7, 1965     R. A. LENFANT     3,222,581
CAPACITIVE PICKUP DEVICES
Filed June 29, 1961                    3 Sheets-Sheet 2
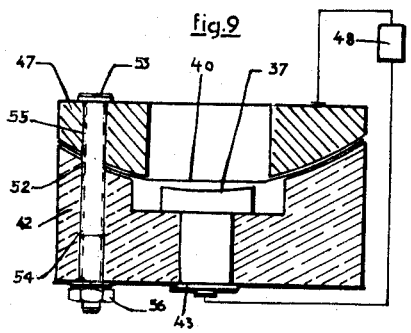
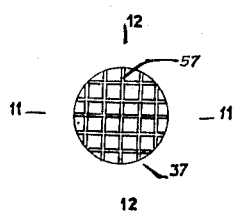 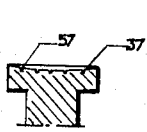 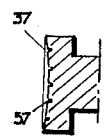
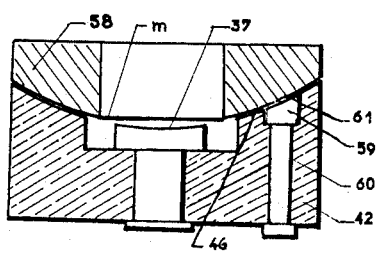
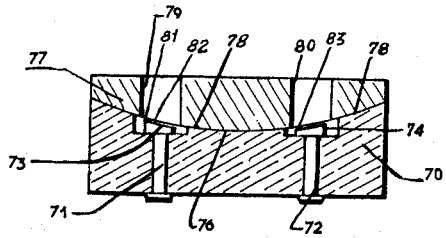
INVENTOR
RENÉ ANDRÉ LENFANT
BY
ATTORNEY Dec. 7, 1965  R. A. LENFANT  3,222,581
CAPACITIVE PICKUP DEVICES
Filed June 29, 1961  3 Sheets-Sheet 3

INVENTOR
RENÉ ANDRÉ LENFANT
BY Fredrick E. Hane
ATTORNEYS

United States Patent Office 3,222,581
Patented Dec. 7, 1965

3,222,581
CAPACITIVE PICKUP DEVICES
René André Lenfant, Paray-Vieille-Poste, France, assignor to Office National d'Etudes et de Recherches Aerospatial, a corporation of France
Filed June 29, 1961, Ser. No. 120,711
Claims priority, application France, July 1, 1960, 831,794, Patent 1,327,719
11 Claims. (Cl. 317—246)

The present invention relates to improved variable-capacitance manometric pickup devices and, more particularly, to pickup devices of the type comprising a conductive diaphragm adapted to be deflected by the pressure varying within an enclosure or chamber defined by said diaphragm, thus causing the capacitance of an electric capacitor of which said diagram constitutes one of the plates to be varied, the other plate thereof being stationary. This capacitor, connected in an electric circuit, will be thus capable of measuring a variable capacitance.

Such pickup devices are particularly useful on account of their high degree of sensitivity, and it is an object of this invention to provide improved devices of this type, the sensitivity of which is substantially increased.

The requirements which govern the design of variable-capacitance pickup devices are of a various and often contradictory nature. The maximum relative variation desirable for the electric capacitance correlative to a variation of the pressure exercised on the diaphragm leads to the necessity of selecting as small a dielectric thickness as possible. On the other hand however, not only must this thickness be such as to prevent, under the effect of the rated pressure variation, the diaphragm to engage the stationary plate or armature, but it is also necessary, in case of a metallized diaphragm, and within a reasonable safety margin, that the electrostatic attraction occurring between the diaphragm and the fixed electrode should not cause the latter elements to stick together. Moreover, in pickup devices with a metal diaphragm, means must be provided to prevent breakdown phenomena, i.e. the occurrence of disruptive sparks.

The structural requirements will however vary in accordance with the outline assigned to the diaphragm and to the fixed capacitor plate, a relative increase of the diameter of the latter plate with respect to that of the generally circularly shaped diaphragm, while assisting the sensitivity desired, will lead to an increased risk of holding said elements under the action of the electrostatic forces. In this connection, a decisive factor is furnished by the configuration which the diaphragm will assume under operating conditions: while, under a zero pressure differential, both faces of the diaphragm remain flat, the diaphragm will bulge under the effect of a pressure increase in the receiver enclosure or chamber.

The design of such a pickup device generally sets up various arduous technical problems, on account of the structural precision required, since the thickness of the dielectric interposed between the capacitor plates is of the order of a few microns. On account of the necessity of providing a preliminary adjustment in order for the device to be brought in the required preliminary operating condition, nearly insuperable difficulties are met with because of the occurrence, particularly, of almost insuperable machining conditions.

On the other hand, however, the uncertain results which may be expected, has made it impossible, up to the present, to design pickup devices with closely predetermined characteristics, so that the association of a number of such devices with a view of providing a differential action or a compensation of interference influences could hardly be carried out in practice.

It is therefore one of the main objects of the present invention to provide a capacitively acting pickup device which, besides its increased sensitivity, may be more readily and more economically manufactured than it was formerly possible.

It is another object of the invention to provide a method of manufacturing a pickup device having predetermined electric characteristics and, more particularly, two or a plurality of such devices having sufficiently similar characteristics to be operated in conjunction, if desired.

It is a further more general object of the invention to provide certain improvements in such devices, which considerably extend the field of application of variable capacitance pickup devices.

According to an essential feature of the invention, the thickness of the dielectric used, instead of being constant, varies along its whole size, this being achieved by conferring the rigid capacitor plate, of a smaller diameter than that of the diaphragm with which it cooperates, a concave shape instead of a flat one as was generally the case up to the present, so that under operating conditions the dielectric is bounded by two curved faces, the sensitivity of the pickup device being then maximum, since the whole diaphragm assists in causing the capacitor to vary, and independent of the ratio between the diameter of the diaphragm and that of the stationary plate.

According to still another feature of the invention, the ratio between the diameter of the diaphragm and that of the capacitor plate is selected in such a manner as to satisfy the requirements relative to the value of the capacitance and to the holding voltage.

According to a preferred embodiment of the invention, the rigid capacitor plate is formed as a spherical surface, the curvature radius of which is determined from the size and parameters of the diaphragm, the sphere on which is located said plate extending through the circle bounding the diaphragm.

A pickup device is thus obtained, the sensitivity of which is increased by about 50% relatively to known arrangements, and being the most satisfactory considering the conditions depending upon the relative variation of the dielectric thickness over the whole plate surfaces and of the supply voltage, the arrangement of the invention being such as to enable the use of a highly flexible diaphragm.

According to another feature of the invention, the seat of the annular diaphragm holder, defining the boundary circle of said diaphragm, is a portion of the sphere of the same radius as the polar surface of the rigid capacitor plate.

According to the invention, a back seat cooperating with said seat is provided for maintaining the diaphragm, said back seat being spherical and located on the same sphere as the polar surface of the stationary plate.

It is thus possible to readily and accurately produce such seat and back or counter seat, as well as said polar surface, such that an accurate relative positioning of both capacitor plates is obtained, thus providing a solution to a near insuperable problem when use is made of a flat-surface polar electrode, and that, after assembly of the various pieces, said seat and back seat, and said polar surface are located substantially on the same sphere.

An embodiment according to the invention may be rendered insensitive to temperature variations.

The invention may also be applied with advantage to the provision of a pickup system comprised of two pickup units.

Both units are then rendered identical, i.e. that, under identical actions of effects to be measured or of parasitic interferences, their responses have the same magnitude, thus making it possible by associating both units to either correct the influence affecting parasitically one of the pickups, which is the only one to be subjected to the action of the phenomenon to be measured, by effecting the signal difference, or to effect, by means of said signal difference, differential measurements on phenomena of the same nature to be compared, whether they are or not mixed with parasitic phenomena.

The invention, both as to its organization and method of operation, as well as additional objects and advantages thereof will be best understood from the following description when read in connection with the accompanying drawings, in which:

FIG. 1 is a diagrammatic view of one embodiment of the device according to the invention.

FIG. 2 is an alternative device, similar to the embodiment illustrated in FIG. 1.

FIG. 3 is an enlarged view of an improved embodiment of the device according to the invention.

FIG. 4 shows an assembly of the embodiment illustrated in FIG. 3.

FIG. 5 is a diagrammatic view of a device of known type.

FIG. 6 is a similar diagrammatic view of the improved device of the invention.

FIG. 7 shows diagrammatically a stage in the manufacturing process.

FIG. 8 is a similar view to that of FIG. 7, relating to another manufacturing step.

FIG. 9 is a similar view to that in FIG. 4, illustrating in more detail a method of assembling the parts of the device.

FIG. 10 is a plane view of the stationary electrode.

FIG. 11 is a cross-sectional view along line 11—11 of FIG. 10.

FIG. 12 is a cross-sectional view along line 12—12 of FIG. 10.

FIG. 13 is a view similar to that illustrated in FIG. 4, but relating to a modified embodiment.

FIG. 14 illustrates a diagrammatic view of a double pickup device.

Figure 15:
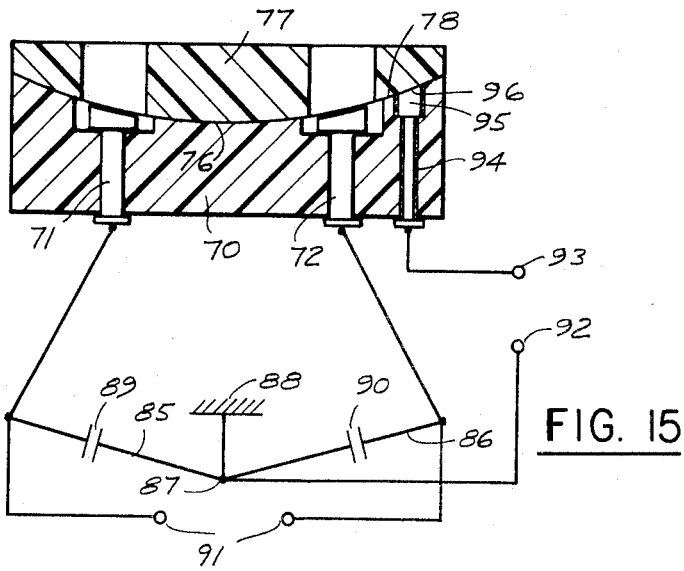
FIG. 15 is a similar view to that in FIG. 14, showing an alternative embodiment and, by way of example, an electric operating wiring diagram.

Referring first to FIG. 1, there is shown a diaphragm 20 which may be thin and constitutes a portion of a wall of an enclosure or chamber 21 wherein the control pressure is provided. Said diaphragm is secured between the flat seat 22 of the wall 23 defining the enclosure and the flat seat 24 of an insulating block 25. The metallized diaphragm 20 remains flat when the pressures applied to both faces thereof are equal; it cooperates with an oppositely lying curved face 26 constituting the end of a metal piece 27 provided with an annular shoulder 28 resting on the bottom 29 of a plate 30 formed in said block.

The diaphragm 20 and the curved surface 26 form a capacitor normally connected in a manner known per se in a circuit of a manometric pickup of this type.

Referring now to FIG. 2, there is shown, in the embodiment illustrated, that the shoulder 31, the curved front face 32 of which constitutes the rigid or stationary plate or armature of the capacitor, has a diameter precisely equal to that of the active portion of the diaphragm 33 which closes the cylindrical chamber 34 wherein the pressure to be measured is applied.

Turning now to FIG. 3, this relates to a preferred embodiment of the invention, wherein the seat or bearing 35 on which rests the diaphragm 36 is spherically shaped, the end face 37 of the electrode 38 constituting the fixed or stationary plate and being located on the same sphere as seat 35. The inner circular edge 39 of seat 35 has a greater diameter than the external edge 40 of the pole face 37.

In the embodiment according to FIG. 4, the rod 41, the shoulder 38 of which forms the end thereof, is sealed in an insulating block 42, a head 43 being provided at the end of the rod, opposite to that carrying the shoulder, a plate 44, formed at the upper face of the block (in the drawing), being bordered by the concave ring formed by the spherical seating 45. The diaphragm 40 is located between the seat 45 which is concave and the convex seat 46 which is spherical and having the same diameter as seat 45, constituting a face of the conductive ring 47. The capacitor, formed by diaphragm 40 and the spherical face 37 is inserted in a circuit 48 adapted to measure capacitive variations. Such an arrangement replaces with advantage the known conventional devices wherein the diaphragm cooperates a rigid flat capacitor armature.

Referring now to FIG. 5, illustrating a conventional device of known type, it is attempted, in this case, to simultaneously obtain a comparatively high capacitance and a comparatively high relative capacitance variation as a function of the pressure variations, resulting, for a given supply voltage, in a distance between the diaphragm $m$ in the flat condition and the rigid flat armature P and in a ratio between the diameter $D_0$ of the operating portion of the diaphragm and the diameter $d_0$ of the rigid armature; in the arrangement according to the invention, as illustrated diagrammatically in FIG. 6, a capacitor of substantially equal capacitance is obtained, but showing a sensitivity of about 50% higher than that of the device illustrated in FIG. 5, for the same supply voltage, and a distance $e_1$ between the apex $s$ of the spheric portion formed by the rigid concave armature C and the diaphragm $m_1$ in the flat condition, substantially equal to the distance $e_0$ between the diaphragm $m$ in the flat condition and armature P.

Excellent results have been obtained, for a distance $e_1$ of about 12 microns, by selecting as the radius of the spherical surface extending through the edge $b_1$ of the operating portion of the diaphragm $m_1$ and containing the concave surface C, a value of 350 mm., the ratio between the diameter of the operating portion of diaphragm $m_1$ and that of the rigid armature being equal to 1.4. The capacitance of the capacitor is of the order of 9 pf.

The fact that the stationary plate or armature is rigidly connected to the block on which it is supported enables to maintain constant the distance at rest between the diaphragm and the stationary armature, whatever the temperature variations, by conveniently selecting the materials which are made use of.

FIG. 7 shows schematically one stage of the manufacturing process of the device according to the invention. The annular surface 45 of the block of insulating material 42 wherein is sealed rod 41 terminating in the rigid armature 38, and surface 37, having both the finally desired spherical shape, but with some excess of material, are ground by means of the same spherical tool 50, so as to finally obtain an annular surface 45 and a central surface 37 placed on the same sphere, according to the invention.

The ring 47 (FIG. 8) the front face 46' of which has received the approximate spherical shape desired, but with some excess of material, is ground by means of a spherical tool 51 having the same curvature radius as the tool 50, but of concave shape. Thus, a spherical seating 46 is obtained, of the same curvature radius as the spherical seating 45. The positioning of ring 47 with respect to block 42 is then obtained with the greatest facility.

FIG. 9 shows, by way of example, assembly means of a block of insulating material 42 and of a ring thus produced, by means of screws 52 the heads 53 of which being inserted into slots 54 and 55 and cooperating with nuts 56.

For damping purposes, the front face 37 of the rigid electrode is fitted, in a manner known for the flat electrodes, with a set of perpendicular grooves such as 57, as shown in FIGS. 10 to 12. Other damping means may however be applied.

Referring now to FIG. 13, it is seen that, in this alternative embodiment, the ring 58 carrying the diaphragm m is also of an insulating material and the electric conduction to said diaphragm is obtained by means of a stud 59 forming the end of a metal rod 60 sealed in the block of insulating material 42 and the face of which is ground simultaneously with the seat 46 and face 37 of the armature; this stud does not carry any grooves. The two armatures of the capacitor formed by diaphragm m on one hand and the concave surface 37 on the other may thus be isolated with respect to the casing.

Considering now FIG. 14, it will be noted that the block of insulating material 70 comprises two electrodes 71 and 72 the end surfaces 73 and 74 of which are formed, by grinding as shown hereinabove, by spherical portions located on the same sphere as the supporting sphere of which the intersection 76 with the plane of the figure is seen in the drawing. The diaphragm holder 77 is bounded by a spherical surface 78 of the same radius as that of said sphere and it comprises two borings 79 and 80, co-axial with the electrodes 71 and 72, respectively. A single diaphragm 81 is located between the opposite spherical seatings, of concave and convex shape, respectively; the portions of said diaphragm at the output of the borings 79 and 80 constitute the moving armatures 82 and 83 cooperating with the pole faces 73 and 74, respectively, to constitute two capacitors sufficiently identical to one another so as to be utilized in a differential or compensating arrangement. The manufacture is carried out in a similar way as described hereinabove for a single capacitor device. The positioning and the assembly may be achieved by means of traversing screws, as previously described.

FIGURE 15 shows a device of this type incorporated in a system which may be applied both for correction parasitic actions on the pickup device adapted to measure the desired phenomenon, and for differential measurements on two similar phenomena each of which is acting on a pickup unit. To effect the difference of the corresponding signals, this device comprises, for instance a bridge the two arms 85 and 86 of which have their mid-point 87 grounded at 88 and carry each a capacitor 89 and 90, respectively, and are connected to the fixed armatures 71 and 72, as well as to the terminals of a supply source 91. The signal is collected between terminal 92 connected to mid-point 87, and terminal 93 connected to diaphragm 78. In the embodiment illustrated, the diaphragm holder 77 is of an insulating material and the block 70, of insulating material, has a rod 94 extending therethrough and sealed therein, which terminates in a stud 95 the operating face 96 of which was ground during the manufacture of the seating 76, according to the same sphere as the latter.

Figure 16:
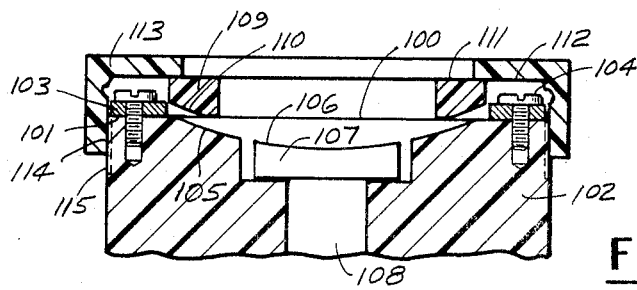
FIG. 16 is a cross-sectional view of another modified embodiment of the device.
Figure 17:
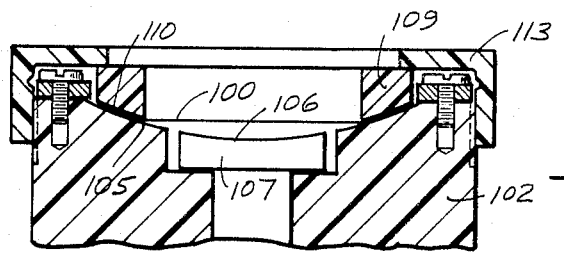
FIG. 17 is a similar view to that shown in FIG. 16, under a different operating condition.

Considering now FIGS. 16 and 17 of the drawings, it is seen that the diaphragm 100 is comprised of metal instead of plastic material, such as metallized collodion of the known types of devices. Said diaphragm is clamped at its periphery between a flat seat 101 defining a block 102 and a washer 103 by means of clamping screws 104. Outside the annular peripheric flat region 101, the upper face (as shown in the drawing) of block 102 is formed by a spherical seating 105 and the end face 106 of electrode 107, the rod 108 of which is sealed in said block 102, is part of the same sphere. Inside washer 103 is slidably mounted a ring 109 the lower edge 110 of which is part of a sphere of the same radius as the sphere just mentioned. Cooperating with the upper face 111 of ring 109 is a shoulder 112 of a nut 113 the threading 114 of which is in engagement with a threading 115 formed on the side face of block 102. As ring 109 is progressively driven in, the metal diaphragm 100 is stretched. The action is stopped when the spherical seating 110 applies the diaphragm against the spherical seating 105 of the same radius (FIG. 17). This embodiment of the device is adapted for measuring comparatively high pressures and for studying acoustical phenomena.

What I claim is:

1. A variable pressure-detecting capacitance device comprising a first block and a second block, said first block including a first chamber and a second chamber, said blocks having curved surfaces facing each other, a first capacitative rigid electrode provided in said second block opposite said first chamber and a second capacitative rigid electrode provided in the second block opposite said second chamber, a diaphragm held between said curved facing surfaces and extending across both said chambers to close the same at the respective end, the deflection of the diaphragm being controlled by the pressures in said chambers and being indicative of the pressure to be detected, each of said rigid electrodes having a capacitatively operative surface facing the diaphragm spaced apart therefrom, said diaphragm constituting a common second capacitative electrode for both said rigid electrodes, the capacitatively operative surfaces of the rigid electrodes and said facing surfaces of the two blocks constituting parts of a common surface of revolution.

2. A variable pressure detecting device comprising a first annular block having an inner surface and an outer surface coaxially disposed in reference to each other, the inner surface defining a chamber, the pressure in which is to be detected, a second block having an outer surface disposed coaxially with the center axis of said first block, said blocks being superimposed and adjacent surfaces thereof defining surfaces of revolution disposed symmetrically with reference to the center axis of the first block, a diaphragm clamped between said adjacent surfaces and sealing said chamber, said diaphragm being deflected in accordance with the pressure in said chamber, the diaphragm constituting a flexible first electrode of a capacitor, said second block including a recess in its surface facing the first block and a lengthwise bore extending from the base of the recess, said recess and said bore being disposed symmetrically in reference to each other and coaxially with the first block, and a second electrode of the capacitor, said second electrode including a rigid plate member disposed in said recess symmetrically in reference to the center axis of said first block and a shank mounting said plate member and fitted in said bore, the side of said plate member facing said diaphragm being concavely curved in reference to the diaphragm, the maximum width of the plate member transverse of said center axis being less than the maximum width of said chamber transverse of said center axis.

3. A variable pressure detecting device comprising an annular first block having an outer surface and an inner surface disposed coaxially with the center axis of said block, said inner surface defining a chamber the pressure in which is to be detected, a cylindrical second block having an outer diameter substantially equal to the outer diameter of said first block, said blocks being superimposed and the adjacent surfaces defining surfaces of revolution disposed symmetrically in reference to said center axis, a diaphragm clamped between said adjacent surfaces and sealing said chamber, said diaphragm constituting a flexible first electrode of a capacitor, the diaphragm being deflected in accordance with the pressure in said chamber, said second block including a recess in its surface facing the first block and a bore extending from the base of said recess, said recess and said bore being disposed coaxially with the center axis of the first block, and a rigid electrode of the capacitor, said second electrode including a cylindrical plate member and a cylindrical shank mounting said plate member and fitted in said bore, the side of said plate member facing the diaphragm being concave in reference to the diaphragm.

4. A device according to claim 3, wherein the ratio of the diameters of said chamber and said plate member is about 1:4.

5. A device according to claim 3, wherein said recess has a greater diameter than said chamber.

6. A device according to claim 2, wherein said adjacent surface of the first block is convex in reference to the second block and said adjacent surface of the second block is concave in reference to the first block.

7. A device according to claim 2, wherein said adjacent surfaces have spherical curvatures, the centers of said curvatures lying on said center axis of the first block.

8. A device according to claim 7, wherein the concave side of said plate member has the same spherical curvature as one of said adjacent surfaces of the blocks.

9. A device according to claim 2, wherein said shank terminates at its end opposite said plate member in an enlarged head portion abutting against the surface of the second block opposite said adjacent surface thereof.

10. A device according to claim 2, wherein said first block is made of electrically conductive material and the second block of insulation material, said diaphragm having a metallized surface, and wherein a source of voltage is connected in circuit with said first block and said plate member.

11. A device according to claim 2, wherein both said blocks are made of insulation material, and wherein the shank of said second electrode is made of electrically conductive material, the concave side of the plate member of the second electrode and the adjacent surface of the second block defining parts of a common spherical curvature.

References Cited by the Examiner
UNITED STATES PATENTS

| | | | |
|---|---|---|---|
| 1,269,808 | 6/1918 | Gray | 51—291 |
| 2,751,530 | 6/1956 | Armstrong | 317—246 |
| 2,945,165 | 7/1960 | Franzel | 317—246 |
| 2,976,466 | 3/1961 | Grinstead | 317—246 |
| 2,999,386 | 9/1961 | Wolfe | 73—398 |
| 3,005,297 | 10/1961 | Spicacci | 51—291 |

JOHN F. BURNS, *Primary Examiner.*